(12) United States Patent
Mauvernay et al.

(10) Patent No.: US 9,354,368 B2
(45) Date of Patent: May 31, 2016

(54) GLASS PANEL HAVING SUN-SHIELDING PROPERTIES

(75) Inventors: Bruno Mauvernay, Paris (FR); Emilie Charlet, Paris (FR); Laura Jane Singh, Paris (FR); Charlotte Poirot, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 131 days.

(21) Appl. No.: 13/814,754

(22) PCT Filed: Jul. 22, 2011

(86) PCT No.: PCT/FR2011/051776
§ 371 (c)(1),
(2), (4) Date: Feb. 7, 2013

(87) PCT Pub. No.: WO2012/020189
PCT Pub. Date: Feb. 16, 2012

(65) Prior Publication Data
US 2013/0155496 A1 Jun. 20, 2013

(30) Foreign Application Priority Data
Aug. 10, 2010 (FR) ..................................... 10 56531

(51) Int. Cl.
*G02B 5/22* (2006.01)
*C03C 17/34* (2006.01)
*C03C 17/00* (2006.01)
*G02B 5/20* (2006.01)
*B32B 17/00* (2006.01)
*B32B 17/06* (2006.01)
*C03C 17/36* (2006.01)

(52) U.S. Cl.
CPC ............ *G02B 5/226* (2013.01); *C03C 17/3435* (2013.01); *C03C 17/366* (2013.01); *B32B 17/00* (2013.01); *B32B 17/06* (2013.01); *B32B 17/061* (2013.01); *C03C 17/00* (2013.01); *C03C 17/36* (2013.01); *C03C 17/3602* (2013.01); *C03C 17/3657* (2013.01); *C03C 17/3681* (2013.01); *C03C 2218/156* (2013.01); *G02B 5/208* (2013.01); *G02B 5/22* (2013.01)

(58) Field of Classification Search
CPC .... C03C 17/00; C03C 17/36; C03C 17/3602; C03C 17/3657; C03C 17/366; C03C 17/3681; G02B 5/226; G02B 5/208; G02B 5/22; B32B 17/00; B32B 17/06; B32B 17/061
USPC ............................... 359/360, 359; 204/192.28
See application file for complete search history.

(56) References Cited

U.S. PATENT DOCUMENTS

| 8,286,395 | B2 * | 10/2012 | Mauvernay et al. ......... 52/204.5 |
| 2005/0079369 | A1 * | 4/2005 | Stachowiak .................. 428/469 |
| 2009/0004412 | A1 * | 1/2009 | Decroupet et al. ............. 428/34 |
| 2009/0022997 | A1 | 1/2009 | Russo et al. |
| 2009/0047466 | A1 * | 2/2009 | German et al. ................. 428/98 |
| 2009/0075069 | A1 * | 3/2009 | Myli et al. .................... 428/336 |
| 2009/0126791 | A1 * | 5/2009 | Lu et al. ........................ 136/258 |
| 2010/0092747 | A1 * | 4/2010 | Chung et al. .................. 428/220 |
| 2010/0133094 | A1 * | 6/2010 | Le et al. .................... 204/192.29 |
| 2010/0167034 | A1 | 7/2010 | Depauw et al. |
| 2011/0027554 | A1 | 2/2011 | Gouardes et al. |
| 2011/0094580 | A1 | 4/2011 | Lu et al. |
| 2011/0315211 | A1 * | 12/2011 | Nghiem et al. ............... 136/256 |

FOREIGN PATENT DOCUMENTS

| EP | 1 538 131 | 6/2005 |
| EP | 1 980 539 | 10/2008 |
| FR | 2 927 897 | 8/2009 |
| FR | 2 939 788 | 6/2010 |
| JP | 2007 329109 | 12/2007 |
| WO | 2005 072946 | 8/2005 |
| WO | WO 2009150343 A2 * | 12/2009 |
| WO | WO 2010034942 A1 * | 4/2010 |

OTHER PUBLICATIONS

Sato, Y. et al., "Electrical and optical properties of Nb-doped TiO2 films deposited by dc magnetron sputtering using slightly reduced Nb-doped TiO2-x ceramic targets," Journal of Vacuum Science & Technology A, vol. 28, No. 4, pp. 851 to 855, (Jun. 29, 2010) XP-002665248.

Mardare, D. et al., "TiO2 thin films doped by Ce, Nb, Fe, deposited onto ITO/glass substrates," Journal of Optoelectronics and Advanced Materials, vol. 8, No. 3, pp. 914 to 916, (Jun. 2006) XP-002665249.

Kao, M. et al., "Microstructure and Optical Properties of Tantalum Modified TiO2 Thin Films Prepared by the Sol-Gel Process," Journal of Superconductivity and Novel Magnetism, vol. 23, pp. 843 to 845, (2010) XP-19824231.

International Search Report Issued Jan. 24, 2012 in PCT/FR11/51776 Filed Jul. 22, 2011.

* cited by examiner

*Primary Examiner* — Stephone B Allen
*Assistant Examiner* — Ryan Dunning
(74) *Attorney, Agent, or Firm* — Oblon, McClelland, Maier & Neustadt, L.L.P.

(57) ABSTRACT

The invention relates to solar-control glazing comprising a glass substrate and a solar-control thin-film multilayer, said thin-film multilayer incorporating a film selectively absorbing infrared radiation having a wavelength longer than 800 nm, said absorbing film consisting of a titanium oxide substituted with an element X chosen from Nb or Ta, the atomic percentage [X/Ti+X] lying between about 4% and about 9% and the thickness of said absorbing film lying between about 20 and about 200 nanometers.

14 Claims, No Drawings

GLASS PANEL HAVING SUN-SHIELDING PROPERTIES

CROSS REFERENCE TO RELATED APPLICATIONS

The present application is a 35 U.S.C. §371 national stage patent application of International patent application PCT/FR2011/051776, filed on Jul. 22, 2011, published as WO 2012/020189 on Feb. 16, 2012, the text of which is incorporated by reference, and claims the benefit of the filing date of French application no. 1056531, filed on Aug. 10, 2010, the text of which is also incorporated by reference.

The invention relates to the field of glass substrates or articles, of the architectural or automotive glazing type, comprising, on their surface, thin-film coatings providing them with solar-control properties. The term "glazing" is understood in the present invention to mean any glass product consisting of one or more glass substrates, in particular single glazing, double glazing, triple glazing, etc. The expression "solar control" is understood in the present invention to mean the ability of the glazing to limit the energy flux, especially the flux of infrared (IR) radiation, passing through it from the exterior to the interior of the dwelling or passenger compartment, while preserving sufficient light transmission, i.e. typically higher than 30, indeed 40 or even 500.

Such glazing, equipped with thin-thin-film multilayers, thus act on the incident solar radiation and enable solar protection and/or thermal insulation of the passenger compartment or dwelling. Furthermore, these coatings must be esthetically pleasing, i.e. they must have a sufficiently neutral color, both in transmission and in reflection, so that users are not inconvenienced, or alternatively a slightly blue or green tint, especially in the architectural field. The simplest of these coatings are conventionally deposited using CVD deposition techniques or more commonly, at the present time, using vacuum sputtering deposition techniques, often called magnetron sputtering in the field, especially when the coating consists of a more complicated multilayer of successive films.

Most commonly, thin-film multilayers having solar-control properties comprise one or indeed more than one active film or films. The expression "active film" is understood to mean a film having a substantial effect on the flux of solar radiation passing through said glazing. Such an active film, as is known, may function either mainly in reflection mode, reflecting the infrared radiation, or mainly in absorption mode, absorbing the infrared radiation.

In particular, the most effective multilayers available on the market at the present time incorporate at least one silver metal film functioning essentially in the reflection mode, reflecting most of the incident IR (infrared) radiation. These multilayers are most commonly termed low-E (low-emissivity) multilayers. These films however are very sensitive to moisture and are therefore only used in double glazing, on face 2 or 3 of the latter, so as to be protected from moisture. The multilayers according to the invention do not comprise such silver type films.

Other metal films with a solar-control function have also been described in the field, comprising functional films of the Nb, Ta or W type or nitrides of these metals, as described for example in application WO 01/21540. However, within such films, the solar radiation this time is absorbed but nonselectively, i.e. IR radiation (i.e. radiation having a wavelength lying between about 780 nm and 2500 nm) and visible radiation are both absorbed nonselectively. Such glazing units thus have selectivities, as described by the $T_L/g$ ratio, close to 1 (light transmission factor/solar factor g, as defined in the standard EN 410 (or NF EN410)). As is known, the light transmission factor or light transmission $T_L$ conventionally corresponds to the percentage of the incident light flux, i.e. in the wavelength range from 380 to 780 nm, passing through the glazing, under illuminant $D_{65}$.

As is known, the solar factor g is equal to the ratio of the energy passing through the glazing (i.e. entering into the premises) to the incident solar energy. More particularly, it corresponds to the sum of the flux transmitted directly through the glazing and the flux absorbed by the glazing (including therein the thin-film multilayers optionally present on one of its surfaces) and then possibly re-emitted towards the interior (the room).

Generally, all the luminous characteristics presented in the present description are obtained according to the principles and methods described in the European (and French) standard EN 410, relating to the determination of luminous and solar characteristics of glazing used as glass in buildings.

One aim of the present invention is thus to provide glazing that comprises a thin-film multilayer giving them solar-control properties and having a high selectivity, in the sense described above, i.e. a $T_L/g$ ratio very much higher than 1, said multilayer being durable without any particular precautionary measures being required. Another aim of the present invention is to provide solar-control glazing in which said multilayer is able to preserve, especially after a heat treatment such as a temper, especially in transmission or in reflection, a substantially neutral color or else a not very strong blue-green tint, as sought in the building sector especially. The expressions "neutral color" or "blue-green tint" are understood in the present invention to mean, in the (L*, a*, b*) color system, a* and b* values that are lower than or close to 10 and negative.

In glazing according to the invention, it is thus advantageously possible to select the radiation that passes through it, by promoting transmission of light waves, i.e. light waves having wavelengths lying between about 380 and 780 nm, and selectively absorbing most of the infrared radiation, i.e. radiation having a wavelength longer than 780 nm, in particular near-infrared radiation, i.e. radiation having wavelengths lying between about 780 nm and about 1400 nm.

According to the invention, it is thus possible for the room or passenger compartment protected by the glazing to remain brightly lit while the amount of heat entering therein is minimized.

According to another advantage of the present invention, glazing equipped with multilayers according to the invention are simple to produce and also substantially reduce production costs, in comparison with other known solar-control glazing panes, especially those comprising a silver-based multilayer.

More precisely, the present invention relates to solar-control glazing that comprises a glass substrate and a solar-control thin-film multilayer, said thin-film multilayer incorporating a film selectively absorbing infrared radiation having a wavelength longer than 800 nm, said absorbing film consisting of a titanium oxide substituted with an element X chosen from Nb or Ta, the atomic percentage [X/Ti+X] lying between about 4% and about 9% and the thickness of said absorbing film lying between 20 and 200 nanometers.

According to preferred embodiments of the present invention:

the atomic percentage [X/Ti+X] lies between about 4% and about 7%, more preferably between about 5 and about 7%;

the thickness of said absorbing film lies between 30 and 100 nanometers; and

X is niobium.

Preferably, according to the invention, the solar-control glazing comprises a multilayer consisting of the following films in succession, starting from the surface of the glass substrate:

one or more lower films for protecting the absorbing film from migration of alkali-metal ions coming from the glass substrate, having a geometrical thickness in total lying between 5 and 150 nm;

said absorbing film consisting of a titanium oxide substituted with a doping element X chosen from Nb or Ta, preferably Nb; and one or more upper films for protecting the absorbing film against oxygen in the air, especially during a heat treatment such as a temper or an anneal, the film or films in total having a geometrical thickness lying between 5 and 150 nm.

Preferably the lower and upper protective film or films are chosen from: silicon nitride $Si_3N_4$ optionally doped with Al, Zr or B; aluminum nitride AlN; tin oxide; a mixed tin zinc oxide $Sn_yZn_zO_x$; silicon oxide $SiO_2$; undoped titanium oxide $TiO_2$; and silicon oxynitrides According to one possible and preferred embodiment of the invention, especially if the glazing must undergo a heat treatment such as a temper, the multilayer furthermore incorporates, between said protective films and the absorbing film, a metal film, optionally partially or completely oxidized and/or nitrided, having a thickness smaller than 5 nm, preferably having a thickness smaller than 3 nm, or even smaller than 2 nm.

This thin film will be partially or completely oxidized or nitrided and will thus protect the absorbing film, for example when the upper film is deposited by reactive sputtering in the presence of nitrogen, as is the case for deposition of an $Si_3N_4$ upper protective film, or else will be oxidized during a temper-type heat treatment. Said thin film is preferably based on a metal such as niobium Nb, tantalum Ta, titanium Ti, chromium Cr, nickel Ni or an alloy of at least two of these metals such as an NiCr alloy. If it is intended only to act as a "sacrificial" film, it may be extremely thin, especially about 0.2 to 1.5 and preferably 0.5 to 1.5 nm in thickness, so as to penalize the multilayer as little as possible in terms of light transmission. It is also possible to give it a thickness possibly reaching as much as 5 nm if it is also used to adjust, to the desired level, the amount of light transmitted, especially if manufacture of solar-control glazing with reduced $T_L$ is intended.

Preferably the metal is chosen from Ti or an NiCr alloy.

According to one well performing embodiment, the multilayer comprises the following films in succession, starting from the surface of the glass substrate:

a lower film having a thickness lying between 5 and 150 nm, chosen from: silicon nitride Si3N4 optionally doped with Al, Zr or B; aluminum nitride AlN; tin oxide; a mixed tin zinc oxide SnyZnzOx; silicon oxide SiO2; undoped titanium oxide TiO2; and silicon oxynitrides SiOxNy;

said absorbing film consisting of a titanium oxide substituted with Nb, the atomic percentage [Nb/Ti+Nb] in said absorbing film lying between about 4% and about 7% and its thickness lying between 30 and 100 nm;

an upper film having a thickness lying between 5 and 150 nm, chosen from: silicon nitride Si3N4 optionally doped with Al, Zr or B; aluminum nitride AlN; tin oxide; a mixed tin zinc oxide SnyZnzOx; silicon oxide SiO2; undoped titanium oxide TiO2; and silicon oxynitrides SiOxNy; and preferably, a titanium metal film optionally partially or completely oxidized and/or nitrided, between said protective films and said absorbing film, having a thickness smaller than 3 nm.

By way of example, the solar-control glazing according to the invention comprises a multilayer consisting of the following films in succession, starting from the surface of the glass substrate:

an $Si_3N_4$ film having a thickness lying between 5 and 100 nm, especially between 5 and 70 nm;

a titanium metal film, partially or completely oxidized and/or nitrided, having a geometrical thickness of smaller than 2 nm;

said film absorbing infrared radiation, the film consisting of a titanium oxide substituted with Nb, the atomic percentage [Nb/Ti+Nb] in said absorbing film lying between about 4% and about 7% and its thickness lying between 30 and 100 nm;

a titanium metal film, partially or completely oxidized and/or nitrided, having a geometrical thickness smaller than 2 nm; and an Si3N4 film having a thickness lying between 5 and 100 nm, especially between 5 and 70 nm.

The invention also relates to a method for manufacturing solar-control glazing, comprising the following steps:

manufacturing a glass substrate; and depositing a thin-film multilayer on the glass substrate using a vacuum magnetron sputtering technique, in which the absorbing film consisting of a titanium oxide substituted with a doping element X chosen from Nb or Ta is obtained by sputtering a target consisting of a titanium oxide substituted with an element X chosen from Nb or Ta, the atomic percentage [X/Ti+X] lying between about 4% and about 9%, in a residual atmosphere of argon or a mixture of argon and oxygen.

An alternative method for manufacturing solar-control glazing according to the invention comprises the following steps:

manufacturing a glass substrate; and depositing a thin-film multilayer on the glass substrate using a vacuum magnetron sputtering technique, in which the absorbing film consists of a titanium oxide substituted with a doping element X chosen from Nb or Ta and is obtained by sputtering a target consisting of a mixture of titanium metal and a metal X chosen from Nb or Ta, the atomic percentage [X/Ti+X] in the target lying between about 4% and about 9%, in a residual atmosphere of oxygen and argon.

The following examples are given purely by way of illustration and do not limit, in any of their aspects described, the scope of the present invention. For the purposes of comparison, all the multilayers of the following examples were synthesized on glass substrates mounted as double glazing. All the films of the multilayers were deposited using conventional magnetron sputtering vacuum-deposition techniques. For the purposes of directly comparing their performance, all the glazing units finally obtained in the following examples were double glazing units consisting of two Planilux® glass substrates that were 6 mm in thickness and separated by an argon-filled cavity that was 16 mm in thickness (6/16Ar/6).

EXAMPLE 1

In this example according to the invention, a multilayer consisting of the following sequence of films was deposited on a Planilux® glass substrate using conventional magnetron techniques:

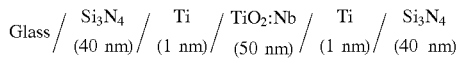

The TiO$_2$ film was obtained using magnetron sputtering of a TiO$_2$ target comprising 6 at % niobium ([Nb$_{at}$/(Ti$_{at}$+Nb$_{at}$)]=0.06]). EPMA (electron probe microanalysis) and SIMS (secondary ion mass spectrometry) were used to check whether the doping level in the film ultimately obtained was substantially the same as that in the composition of the target.

The substrate equipped with its multilayer was then subjected to a heat treatment consisting of heating to 650° C. for a few minutes followed by a temper.

This treatment is representative of the conditions experienced by the glazing if the latter has to be tempered or else bent.

The substrate was mounted within a double glazing unit with another Planilux® substrate (6/16Ar/6), such that the thin-film multilayer was located on face 2 of the multilayer.

In order to determine the selectivity of this double glazing, its T$_L$ and g factors were measured.

COMPARATIVE EXAMPLE 1

In this example, a multilayer substantially identical to example 1 was obtained in the same way except that the target used for depositing the TiO$_2$ film this time did not contain niobium.

To determine the selectivity of this double glazing, its T$_L$ and g factors were measured under the same conditions as previously.

COMPARATIVE EXAMPLE 2

In this example, a double glazing unit (6/16Ar/6) sold by Saint-Gobain Glass France under the reference Cool Lite KN 164 was used, the active film of which, i.e. the film acting on the solar radiation passing through said glazing, was a silver film of about 10 nanometers in thickness, said silver film being positioned in a multilayer deposited on face 2 of the double glazing.

In order to determine the selectivity of this commercially available double glazing, its T$_L$ and g factors were measured under the same conditions as previously.

COMPARATIVE EXAMPLE 3

In this example, a double glazing unit (6/16Ar/6) sold by Saint-Gobain Glass France under the reference Cool Lite ST 167 was used, the active film of which, i.e. the film acting on the solar radiation passing through said glazing, was a niobium-nitride film about 15 nanometers in thickness, said niobium-nitride film being positioned in a multilayer deposited on face 2 of the double glazing.

To determine the selectivity of this commercially available double glazing, its T$_L$ and g factors were measured under the same conditions as previously.

COMPARATIVE EXAMPLE 4

This example was identical to example 1 but with the following modifications:

the TiO$_2$ film was obtained by the magnetron sputtering technique using a TiO$_2$ target comprising about 1.7 at % niobium; and the run speed of the glass substrate through the magnetron chamber was adjusted such that the TiO$_2$:Nb film deposited had a thickness equal to 300 nm.

To determine the selectivity of this double glazing, its T$_L$ and g factors were measured under the same conditions as previously.

The properties of the various glazing units obtained, measured according to the standard EN 410, are given in table 1 below:

TABLE 1

|  | Example 1 | Comp. example 1 | Comp. example 2 | Comp. example 3 | Comp. example 4 |
|---|---|---|---|---|---|
| Active film | TiO$_2$:Nb (6 at %) | TiO$_2$ | Ag | Nb | TiO$_2$:Nb (1.7 at %) |
| Thickness of the active film (nm) | 50 | 50 | 10 | 15 | 300 |
| T$_L$ (%) | 60 | 85 | 58 | 60 | 72 |
| g (%) | 51 | 80 | 46 | 58 | 65 |
| Selectivity (T$_L$/g) | 1.18 | 1.06 | 1.26 | 1.02 | 1.11 |

Comparison of the data given in table 1 shows that a 50 nm thick, undoped TiO$_2$ film (comparative example 1) is not selective and appears relatively transparent, both to visible light and to heat, in particular to thermal infrared. Introducing the dopant Nb into this film, in high concentrations of about 6% according to the invention (example 1), makes it possible however, by preserving a film thickness that is equally as small, to increase substantially the selectivity of the glazing. The selectivity levels thus obtained are thus closer to those observed for low-E multilayers based on a silver film (comparative example 2), which however operate not in the near-infrared absorption mode but in the near-infrared reflection mode. Such a result is, in this regard, very surprising.

Comparing example 1 according to the invention and comparative example 3 indicates that glazing units equipped with active films functioning mainly by absorption of the solar radiation, according to the invention, are much more selective than other known solar-control films functioning according to the same principle, in particular niobium-based or niobium-nitride-based films.

Finally, comparing example 1 according to the invention and comparative example 4 indicates that the combination of a niobium doping level close to 6% and a small film thickness (50 nm) makes it possible, ultimately, to obtain multilayers the selectivity of which is higher than that of multilayers comprising an active film the doping level of which is lower but the thickness of which is six times larger. Such a result is unexpected in that it is known that the infrared-reflection properties of a transparent oxide film such as TiO$_2$ increase greatly with its thickness.

The colorimetric values of the glazing, in the (L*, a*, b*) system were also measured in transmission, in internal reflection (passenger compartment side) and in external reflection (exterior side) and are given in table 2 below.

TABLE 2

| Example | LIGHT TRANSMISSION | | | | | INTERIOR REFLECTION | | | EXTERIOR REFLECTION | | |
|---|---|---|---|---|---|---|---|---|---|---|---|
| | $T_L$ | g | $T_L/g$ | $a^*_T$ | $b^*_T$ | $R_{Lint}$ | $a^*_{Rint}$ | $b^*_{Rint}$ | $R_{Lext}$ | $a^*_{Rext}$ | $b^*_{Rext}$ |
| Example 1 | 60 | 0.51 | 1.18 | −3.1 | −0.5 | 9 | −6 | −9.5 | 10 | −5.6 | −13.7 |
| Comp. example 3 | 58 | 0.46 | 1.26 | −2.8 | −2.1 | 3 | 8.6 | −9.8 | 10 | −1.8 | −7.0 |

The data collated in table 2 show the ideal colorimetry properties of glazing equipped with multilayers according to the invention: the a* and b* parameters according to example 1 are always negative and relatively low, whatever the position and viewing angle of the observer, in transmission as in reflection.

Such colorimetric or properties result in the glazing having a slight blue-green or neutral color, as is currently desired in the architectural field.

According to another advantage, the solar-control multilayers according to the present invention, the active film of which is based on a doped titanium oxide having a relatively small thickness, i.e. a few tens of nanometers, are extremely simple and inexpensive to manufacture, especially using the magnetron sputtering vacuum-deposition technique: The small thickness of the titanium oxide film specifically makes a not insignificant increase in productivity possible, because the run speed of the substrate through the deposition chamber is directly proportional to the desired thickness of said film.

Furthermore, additional durability tests showed that such films could be easily deposited on face 2 of a single glazing unit, without risking degradation of the latter, whether via chemical action (moisture) or via mechanical action (abrasion of the multilayer).

The invention claimed is:

1. An automotive or architectural solar-control glazing, comprising:
   a glass substrate; and
   a solar-control thin-film multilayer comprising, in succession from a surface of the glass substrate:
      at least one lower protective film, which protects the absorbing film from migration of alkali-metal ions from the glass substrate, the lower film(s) having a total geometrical thickness of between 5 and 150 nm,
      an absorbing film, which selectively absorbs infrared radiation having a wavelength longer than 800 nm, the absorbing film having a total geometrical thickness of between about 20 nanometers and about 200 nanometers, and
      at least one upper protective film, which protects the absorbing film from oxygen in the air, the upper film(s) having a total geometrical thickness of between 5 and 150 nm,
   wherein the absorbing film consists of a titanium oxide substituted with a dopant element, X, which is Nb or Ta, wherein an atomic percentage, [X/Ti+X], is between about 4% and about 9%,
   wherein the glazing acts on solar radiation to protect and/or thermally insulate a passenger compartment of an automotive or a dwelling, and
   wherein the solar-control thin-film multilayer does not comprise a silver type film.

2. The glazing of claim 1, wherein the atomic percentage, [X/Ti+X], is between about 4% and about 7%.

3. The glazing of claim 1, wherein the thickness of the absorbing film is between 30 and 100 nanometers.

4. The glazing of claim 1, wherein X is niobium.

5. The glazing of claim 1, wherein the lower and upper protective films each independently comprise: silicon nitride ($Si_3N_4$) optionally doped with Al, Zr, or B; aluminum nitride (AlN); tin oxide; a mixed tin zinc oxide ($Sn_yZn_zO_x$); silicon oxide ($SiO_2$); undoped titanium oxide ($TiO_2$); or a silicon oxynitride ($SiO_xN_y$).

6. The glazing of claim 1, wherein the multilayer further comprises:
   a first metal film between the lower protective film and the absorbing film; and
   a second metal film between the upper protective film and the absorbing film;
   wherein the first and second metal films are optionally partially or completely oxidized, nitrided, or a combination thereof, and
   wherein the first and second metal films each have a thickness of less than 5 nm.

7. The glazing of claim 6, wherein the metal of the first and second metal films is Ti or a NiCr alloy.

8. The glazing of claim 1, wherein the multilayer comprises in succession from a surface of the glass substrate:
   the lower protective film, which is: silicon nitride ($Si_3N_4$) optionally doped with Al, Zr, or B; aluminum nitride (AlN); tin oxide; a mixed tin zinc oxide ($Sn_yZn_zO_x$); silicon oxide ($SiO_2$); undoped titanium oxide ($TiO_2$); or a silicon oxynitride ($SiO_xN_y$);
   the absorbing film, which is a titanium oxide substituted with Nb, wherein the atomic percentage, [Nb/Ti+Nb], in the absorbing film is between about 4% and about 7% and the thickness of the absorbing film is between 30 and 100 nm;
   the upper protective film, which is: silicon nitride ($Si_3N_4$) optionally doped with Al, Zr, or B; aluminum nitride (AlN); tin oxide; a mixed tin zinc oxide ($Sn_yZn_zO_x$); silicon oxide ($SiO_2$); undoped titanium oxide ($TiO_2$); or a silicon oxynitride ($SiO_xN_y$).

9. The glazing of claim 1, wherein the multilayer comprises in succession from a surface of the glass substrate:
   the lower protective film, which is an $Si_3N_4$ protective film having a thickness between 5 and 100 nm;
   a first titanium metal film, which is partially or completely oxidized, nitrided, or a combination thereof, wherein a geometrical thickness of the first titanium metal film is less than 2 nm;
   the absorbing film, which absorbs infrared radiation and is a titanium oxide substituted with Nb, the atomic percentage [Nb/Ti+Nb] in the absorbing film lying between about 4% and about 7%, wherein the thickness of the absorbing film is between 30 and 100 nm;
   a second titanium metal film, which is partially or completely oxidized, nitrided, or a combination thereof, wherein a geometrical thickness of the second titanium metal film is less than 2 nm; and
   the upper protective film, which is an $Si_3N_4$ protective film having a thickness between 5 and 100 nm.

10. A method for manufacturing the glazing of claim 1, the method comprising:

manufacturing a glass substrate; and depositing a thin-film multilayer on the glass substrate with a vacuum magnetron sputtering technique, wherein the absorbing film is obtained by sputtering a target comprising a titanium oxide substituted with the dopant element, X, wherein the atomic percentage [X/Ti+X] is between about 4% and about 9%, in a residual atmosphere of argon or a mixture of argon and oxygen.

11. A method for manufacturing the glazing of claim 1, the method comprising:

manufacturing a glass substrate; and depositing a thin-film multilayer on the glass substrate with a vacuum magnetron sputtering technique, wherein the absorbing film is obtained by sputtering a target comprising a mixture of titanium metal and the metal X, which is Nb or Ta, wherein the atomic percentage, [X/Ti+X], in the target is between about 4% and about 9%, in a residual atmosphere of oxygen and argon.

12. The glazing of claim 6, wherein the first and second metal films each have a thickness of less than 3 nm.

13. The glazing of claim 8, further comprising, between the lower protective film and the absorbing film:

a first titanium metal film optionally partially or completely oxidized, nitrided, or a combination thereof, wherein the first titanium metal film has a thickness of less than 2 nm.

14. The glazing of claim 13, further comprising, between the upper protective film and the absorbing film:

a second titanium metal film optionally partially or completely oxidized, nitrided, or a combination thereof, wherein the second titanium metal film has a thickness of less than 2 nm.

* * * * *